United States Patent
Burroughs et al.

(10) Patent No.: US 7,155,552 B1
(45) Date of Patent: Dec. 26, 2006

(54) APPARATUS AND METHOD FOR HIGHLY AVAILABLE MODULE INSERTION

(75) Inventors: John V. Burroughs, East Sandwich, MA (US); Stephen E. Strickland, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 129 days.

(21) Appl. No.: 10/950,951

(22) Filed: Sep. 27, 2004

(51) Int. Cl.
*G06F 13/00* (2006.01)

(52) U.S. Cl. .................. 710/300; 710/301; 710/302
(58) Field of Classification Search .............. None
See application file for complete search history.

(56) References Cited

U.S. PATENT DOCUMENTS

| | | | | |
|---|---|---|---|---|
| 5,297,067 | A * | 3/1994 | Blackborow et al. | 710/305 |
| 5,754,112 | A * | 5/1998 | Novak | 340/635 |
| 5,802,328 | A * | 9/1998 | Yoshimura | 710/301 |
| 5,909,584 | A * | 6/1999 | Tavallaei et al. | 713/300 |
| 6,449,725 | B1 * | 9/2002 | Deenadhayalan et al. | 713/324 |
| 6,457,071 | B1 * | 9/2002 | Thorland et al. | 710/19 |
| 6,789,149 | B1 * | 9/2004 | Bhadsavle et al. | 710/302 |
| 6,802,023 | B1 * | 10/2004 | Oldfield et al. | 714/7 |
| 6,901,531 | B1 * | 5/2005 | Gilbert et al. | 714/5 |
| 6,924,986 | B1 | 8/2005 | Sardella et al. | |
| 2004/0168008 | A1 * | 8/2004 | Benson et al. | 710/306 |
| 2005/0135069 | A1 | 6/2005 | King, Jr. et al. | |
| 2005/0186810 | A1 | 8/2005 | Sardella et al. | |

OTHER PUBLICATIONS

Configuration Boot Disks, Sun Microsystems, Inc., Dec. 2001.*
Definition of Boot Disk, Wikipedia.*
Definition of Redundant Array of Independent Disks, Wikipedia.*

* cited by examiner

*Primary Examiner*—Khanh Dang
(74) *Attorney, Agent, or Firm*—BainwoodHuang

(57) ABSTRACT

Modules coupled to multiple connectors can check to see if full connectivity is provided through the connectors. If it is not, for instance because the connectors are mis-seated, the modules can prevent themselves from fully powering up. In a storage environment, a first module is coupled to connectors. The connectors are coupled to corresponding disk drives. Each connector provides a connectivity indication. The module prevents itself from fully powering up if it fails to receive a connectivity indication from a subset of connectors coupled to boot disks.

16 Claims, 5 Drawing Sheets

APPARATUS AND METHOD FOR HIGHLY AVAILABLE MODULE INSERTION

FIELD OF THE INVENTION

The present invention relates generally to field of highly available systems, and particularly to the identification of proper connector connectivity in a highly available system.

BACKGROUND OF THE INVENTION

Today's networked computing environments are used in businesses for generating and storing large amounts of critical data. For example, banks, insurance companies, and manufacturing companies generate and store critical data related to their business and to their customers. It is therefore very important that the storage systems used for storing the critical data are highly reliable. "High Availability" storage systems employ various means for optimizing the reliability of storage systems.

High Availability systems are generally designed such that single points of failure are avoided. One means for avoiding single points of failure is to provide redundant components. For example, two processors may be provided such that if one fails, the other can assume the role of the first processor as well as its own. Or, redundant software code may be provided such that, if the medium on which one code image resides fails, the redundant image may be accessed.

In a particular storage environment, for each redundant controller module, redundant boot code images are stored on different disk drives. The disk drives containing the boot code images ("boot disks") are coupled to particular ones of a set of connectors that couple the modules to the drives. The connectors are subject to failure themselves. Failure of full or partial connectivity through a connector is often due to mis-seating of the connector halves upon insertion of a module enclosure into the storage system chassis. Such a failure can prevent one or more of the modules from accessing its boot disks. In order to improve high availability of the storage system, it would be advantageous to be able to identify and react to connector connectivity failures, particularly where access to boot disks may be affected.

SUMMARY OF THE INVENTION

In accordance with the principles of the invention, modules containing multiple connectors can check to see if full connectivity is provided through the connectors. If it is not, for instance because the connectors are mis-seated, the modules can prevent themselves from fully powering up and attempting to boot.

Accordingly, a first module is coupled to a plurality of connectors. The connectors are coupled to a plurality of corresponding devices. Each connector is capable of providing a connectivity indication. The module prevents itself from fully powering up if it fails to receive a connectivity indication from each connector in a subset of the plurality of connectors.

The devices may be for example disk drives. A subset of these disk drives can serve as first module boot disks. Each boot disk is coupled to one of the connectors in the subset of the plurality of connectors. Thus, for example, if two boot disks are coupled to two of four connectors, the module will not power if neither of the two connectors to which the boot disks are coupled are operational.

More particularly, each connector of the plurality of connectors includes a first section for coupling to the first module and a second section coupled to the disk drives. The connectivity indication indicates that the first section is properly mated to the second section.

For further high availability, a second module is coupled to the plurality of connectors. Each disk drive in a second subset of the plurality of disk drives is a second module boot disk, and each second module boot disk is coupled to one of the connectors in a second subset of the plurality of connectors. The second module prevents itself from fully powering up if the second module fails to receive a connectivity indication from each connector in the second subset of the plurality of connectors when coupled to the plurality of connectors. In this manner, two modules can be coupled via connectors to two different sets of boot disks. If the connectors coupled to all the boot disks for either module are not properly connected, that module will not fully power up.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
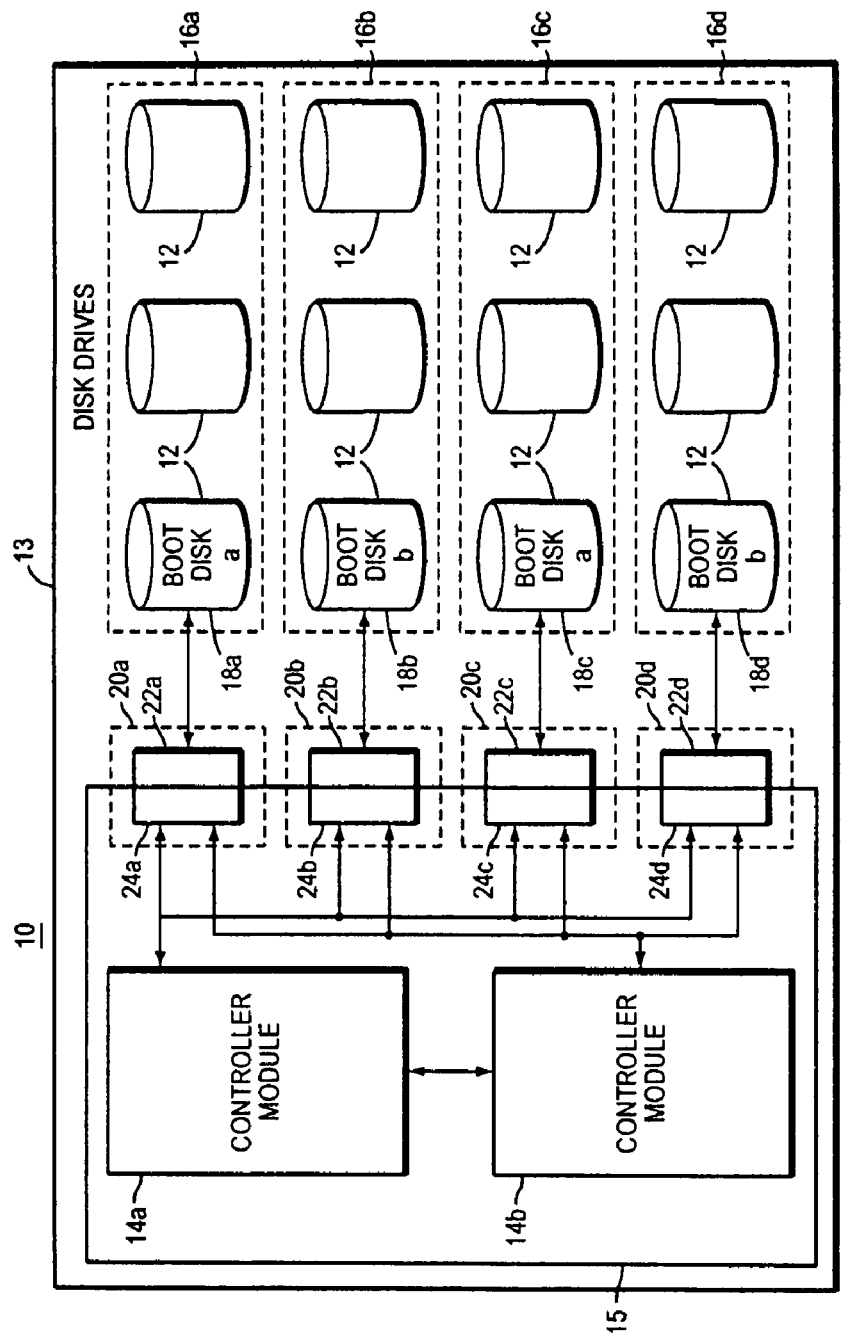
FIG. 1 is a schematic representation of a storage system in which the invention may be implemented.

Referring to FIG. 1, there is shown a storage system 10 that is one of many types of systems in which the principles of the invention may be employed. The storage system 10 includes multiple disk drives 12 and controller modules 14a and 14b. The disks 12 reside in a chassis 13, and the controller modules 14a,b reside in an enclosure 15 that is inserted into the chassis to mate with the disk drives 12. As herein shown, sets 16a–d of three disk drives 12 are coupled to each of four connectors 16a–d for a total of twelve drives. The storage system 10 is a "highly available" system. Many redundancies are employed in a highly available system in order to avoid downtime due to component and system failures. The two controller modules 14a,b are redundant such that if one fails, the other continues to operate and access to the disk drives 12 is maintained.

Furthermore, one disk drive 18a–d in each of the four sets 16a–d operates as a boot disk 18. Disk drives 18a,c store mirror image boot code for the controller module 14a. Disk drives 18b,d store mirror image boot code for the controller module 14b. Thus, if drive 18a becomes inaccessible, the controller module 14a can still boot from drive 18c. Likewise, if either of drives 18b–d become inaccessible, the controller module 14b can boot from the other. Note that, in this highly available system, three of the four boot drives can be inaccessible but at least one controller module 14a,b can boot and operate.

According to one arrangement of the system of FIG. 1, connectors 20 a–d couple the controller modules 14a,b to the disk drives 12 upon insertion of the enclosure 15 into the chassis 13. Each connector 20*a–d* includes two mating sections that mate together to connect the controller modules 14*a,b* to the disk drives 12. The disk connectors 22*a–d* are coupled to the disks 12, while the module connectors 24*a–d* are coupled to the controller modules 14*a,b*. In order to achieve full access to all the disk drives 12, including the boot drives 118*a–d*, the disk connectors 22*a–d* and module connectors 24*a–d* must be properly mated. So, if the enclosure 15 is not properly plugged in to the chassis 13, the system is not fully functional. Furthermore, if for example the connectors 20*a,c* coupled to the module book disks 18*a,c* are not properly mated, then the module 14*a* cannot properly access its boot disks 18*a,c* and therefore should not attempt to further power up and boot.

Figure 2:
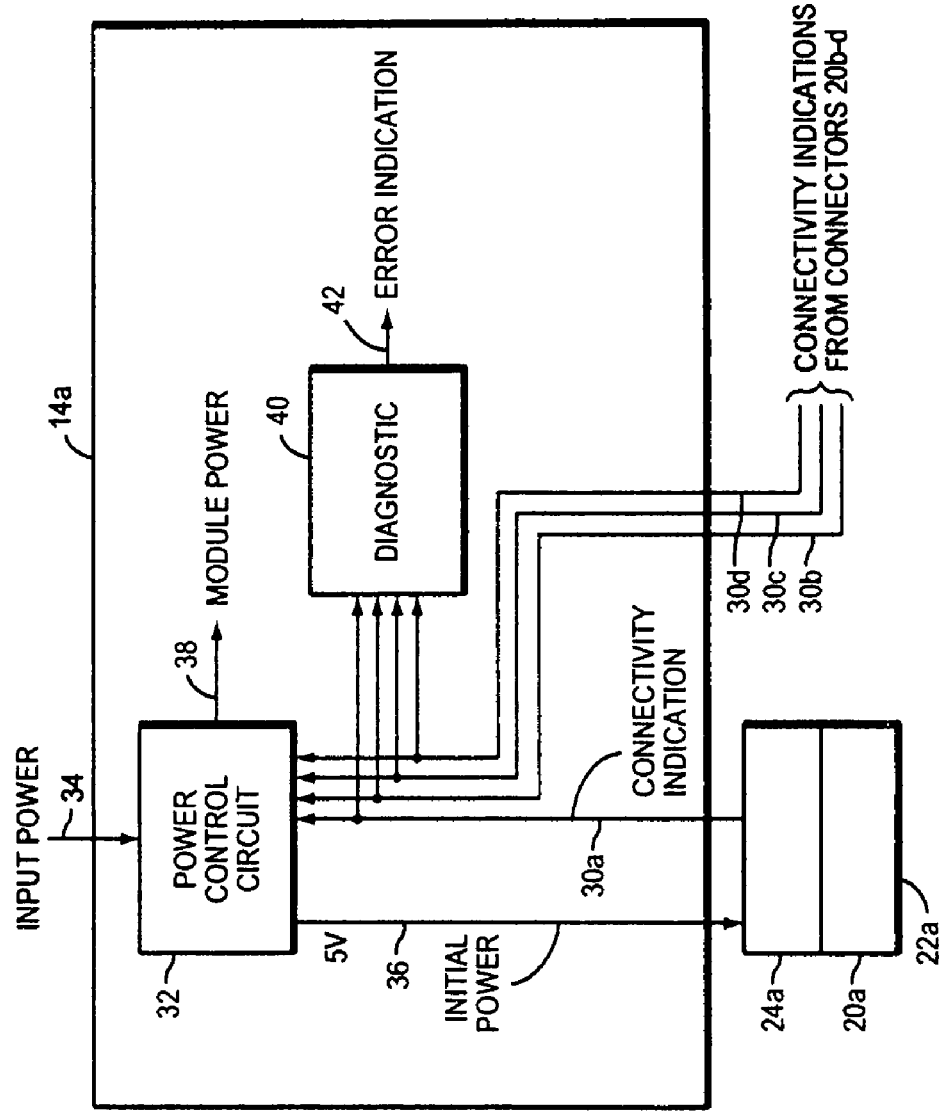
FIG. 2 is a schematic representation of a module of FIG. 1 showing a power control circuit for controlling module power in response to connectivity indications from connectors.

In accordance with the principles of the invention, as shown in FIG. 2, each connector 20*a–d* is capable of providing a connectivity indication 30*a–d* to each module 14*a,b*. (Module 14*a* is shown, module 14*b* being the same.) Each connectivity indication indicates whether the corresponding connector sections 22 and 24 are properly mated. If for example the connector halves 22*a* and 24*a* are properly mated, then full connectivity is assured through the connector 20, and the connectivity indication 30*a* is asserted. If, on the other hand, the connector sections 22*a* and 24*a* are not properly mated, it is probable that full connectivity is not assured through the connector 20*a* and therefore the connectivity indication 30*a* is not asserted.

This functionality is employed to test the integrity of the connection achieved during mating of the connector halves 22*a–d* and 24*a–d* upon insertion of the enclosure 15 into the chassis 13. As shown in FIG. 2, each module 14*a–b* (module 14*a* is shown here) includes a power control circuit 32 coupled to the connectivity indications 30*a–d*. The power control circuit 32 receives power input 34 from a power source external to the enclosure 15. The power control circuit 32 provides initial power 36 to control basic module functions such as the connectivity indications 30*a–d*. The power control circuit 32 also provides module power 38 for fully powering the remaining module functions, in response to the connectivity indications 30*a–d* that it receives as input. The power control circuit 32 prevents the module 14*a* from fully powering up if it fails to receive connectivity indications from a particular subset of the connectors 20*a–d*, as will be further described. The connectivity indications 30*a–d* are also input to a diagnostic function 40 that produces an error indication 42 for indicating the connectivity failure of any of the connectors 20*a–d*.

Consider now for example that connector 22*a* is not properly mated with connector 24*a*, but all other connectors 20*b–d* are properly mated. In this case, the connectivity indication 30*a* is not asserted, indicating a failure of connectivity of the connector 20*a* and thus lack of proper access to the boot disk 18*a*. The module 14*a* can however boot from the boot disk 18*c* via the connector 20*c*. The controller module 14*b* boots normally. In this single connector failure scenario, the error indication 42 indicates the failure of the connector 20*a*. The error indication may be utilized in a variety of ways to report the error. For example, the error indication 42 can drive a diagnostic LED, or can be read via a maintenance port to generate an error, or can be read via software that reports the error back to a host server or controller. In response to the error indication, a user can re-install the enclosure 15 within the chassis 13 in order to reseat the connector 20*a* and thus repair the problem. Note that multiple connector failures can be reported in the described manner.

In a particular failure scenario, both module connectors 22*a* and 22*c* fail to properly mate with corresponding disk connectors 24*a* and 24*c*. In this particular scenario, the combination of connector failures prevents the module 14*a* from properly accessing either of its boot disks 18*a* and 18*c* to which the connectors 20*a* and 20*c* are coupled. In this case, the power controller module 14*a* is prevented by the power control circuit 32 from fully powering up and booting. Controller 14*b*, however, can boot and provide a diagnostic indication that the module 14*a* is non-operational. Again, the user can re-install the enclosure 15 within the chassis 13 in order to reseat the connectors 20*a* and 20*c* and thus repair the problem.

More particularly, in accordance with the invention, if upon installation of the enclosure 15 into the chassis 13 the connectors 22*a,c* and 24*a,c* fail to properly mate, the connectivity indications 30*a,c* from the corresponding connectors 20*a,c* will not be asserted. The power control circuit 32 prevents the module 14*a* from fully powering up if it fails to receive connectivity indications from a particular subset of the connectors 20*a–d*. In accordance with the current example, that subset of connectors is the subset coupled to the boot disks 18*a,c*. Thus, when the power control circuit 32 detects that the connectivity indications 30*a* and 30*c* are not asserted, it disables the module power output, which in turn prevents the module 14*a* from powering up and attempting to boot.

Figure 3:
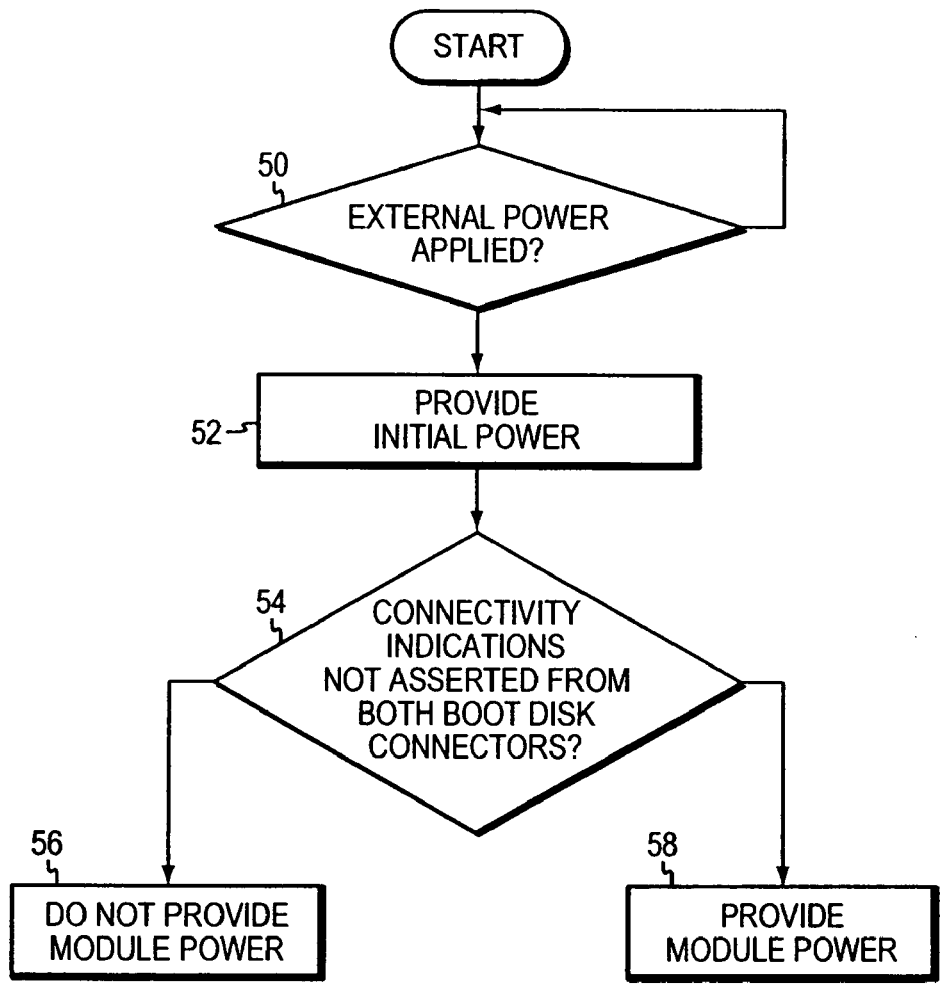
FIG. 3 is a flow diagram representing the operation of the power control circuit of FIG. 2.

The functionality of the power control circuit 32 as it operates in this particular scenario is shown in FIG. 3. Once external power is applied to the module 14*a* (step 50), the power circuit 32 provides the initial power 36 for powering parts of the module 14*a*—for example the connectivity indications 30*a–d* (step 52). If the connectivity indications for both boot disk connectors 20*a,c* are deasserted (step 54), the module power output remains deasserted and the module is thus prevented from fully powering up and attempting to boot (step 56). If, on the other hand, either connectivity indication 20*a* or 20*c* is asserted, the module 14*a* can access a boot disk 18*a* or 18*c* and so the module power output is asserted (step 58). Note that, as long as the subset of connectors 20*a, c* assert their connectivity indications, the connectivity failures of the other connectors 20*b,d* do not affect the module power output, since the module 14*a* can boot without full connectivity on the connectors 20*b,d*. The failures of the other connectors are reported via the diagnostic function 40.

If, in a different failure scenario, all four module connectors 22*a–d* fail to properly mate with disk connectors 24*a–d*, neither module is capable of booting. It is particularly advantageous in this case to prevent the system from fully powering up, because the four connector failure indications may indicate that the enclosure is not plugged into a chassis 13 and the back of the enclosure 15 is exposed. Depending on enclosure design, exposure of the back of the enclosure 15 during power-up may cause safety issues. For example, if a moving mechanical component such as a fan is located at the back of the exposed enclosure 15, injury can be avoided by preventing the enclosure 15 from powering up.

Figure 4:
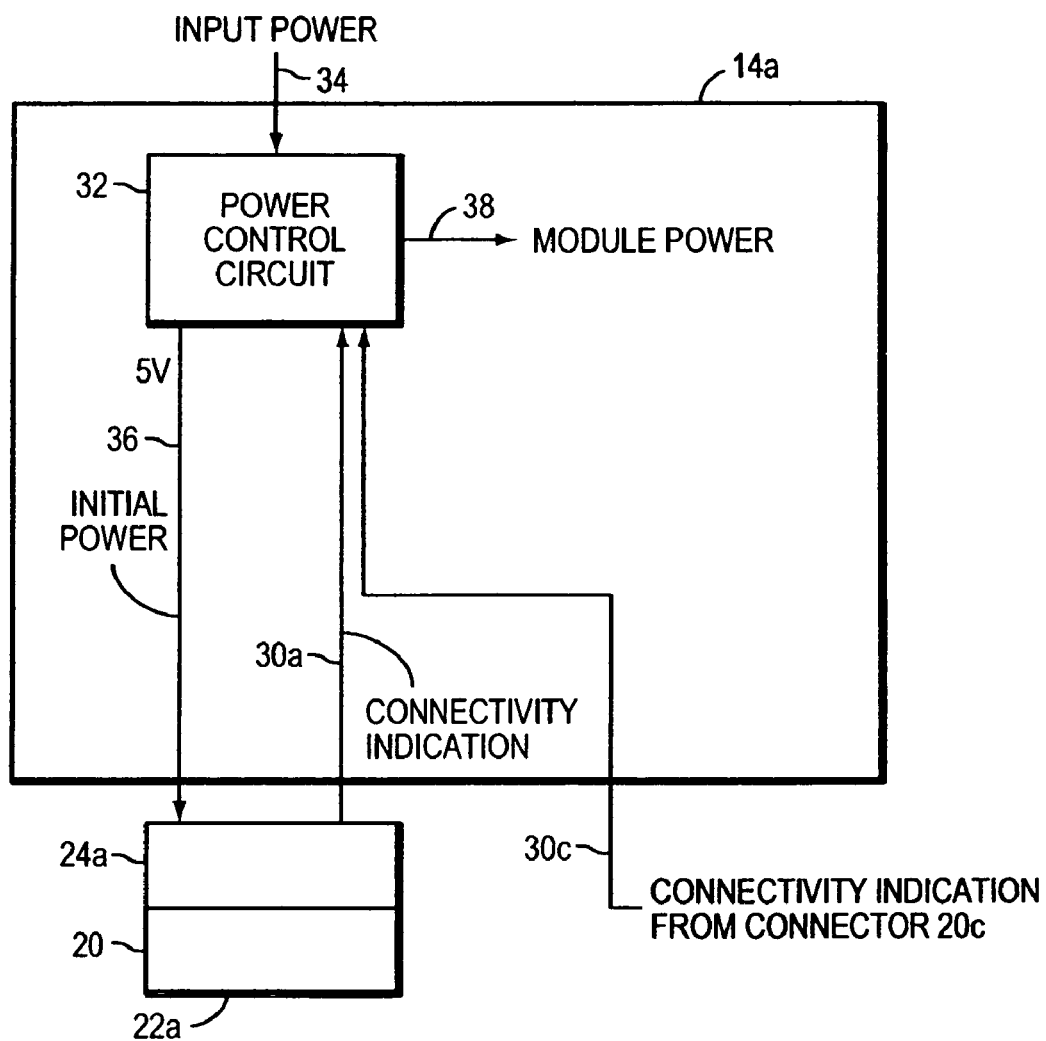
FIG. 4 is a schematic representation of an alternate embodiment of the module of FIG. 2.

In accordance with an alternate embodiment of the module 14*a* as shown in FIG. 4, only the connectivity indications from the subset of connectors coupled to the boot drives 18*a,c*—that is, connectivity indications 30*a* and 30*c*—are input to the power control circuit 32. In this embodiment, the power control circuit 32 operates the module power output 38 in the same manner as shown in FIG. 3, but diagnostic indications of failures of the other connectors 20*b,d* are not provided. Note that, in a dual module system such as that of FIG. 1, each module 14a,b is monitoring the connectivity indications from different connectors. That is, module 14a monitor connectivity indications 30a,c while module 14b monitors connectivity indications 30b,d. If neither module powers up, this indicates that all four connectors 20a–d are mis-seated. This implementation is useful in a design environment where the primary concern is the prevention of enclosure power if no boot disks are available.

The invention as shown in FIGS. 2 and 3 is also useful in a single module environment. If for example the module 14b is not present in the system of FIG. 1, the invention is still employed on the module 14a, in either of the forms shown in FIGS. 2 and 4. The invention is broadly applicable in any systems including modules coupled to devices via multiple connectors.

Figure 5:
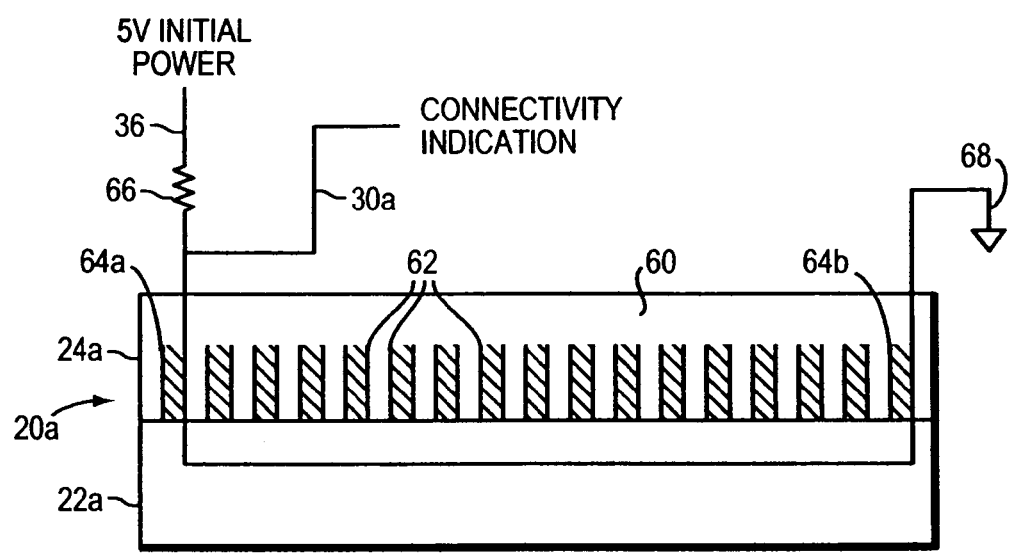
FIG. 5 is a schematic representation of a connector as shown in FIGS. 1, 2, and 4.

In accordance with a preferred embodiment of the connectors, the connectors 20a–d are known edge style connectors. Referring to FIG. 5, the connector 20a is shown. The module connector 24a for example is a male connector including a PCB portion 60 on which separate conductive strips 62 for transferring power, ground, and signals reside. The corresponding disk connector 22b is a female connector having flexible conductive members (not shown) corresponding to the conductive strips of the connector 22a. When the module connector 24a is inserted into the disk connector 22a, the conductive members electrically contact the conductive strips 62, such that power, ground, and signals can be transferred through the connector 20a.

More particularly, the module connector 22a includes conductive strips 64a–b located at each end of the PCB portion 60. The strip 64a is coupled to a pull-up resistor 66, which is in turn coupled to a voltage V. The strip 64b is coupled to ground 68. A connective strip or wire 70 runs from strip 64a across the PCB portion to strip 64b. The connectivity indication 30a is coupled from the pull-up resistor 66 to the diagnostic circuit 40 and power control circuit 32. When the connector section 22a is properly inserted into the connector section 22b, a circuit is produced between the strip 64a and the grounded strip 64b, causing the connectivity indication signal 30a to change from an indication of a level of voltage "V" to an indication of a ground level. In other words, when the ground level is detected by the power circuit 32 on the connectivity indication 30a, the connectivity indication 30a is considered asserted. Preferably, the voltage "V" is provided by the initial power 36.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. For example, though an edge connector is described, other types of connectors could be used that provide a connectivity indication. The functions of the power control circuit and diagnostic circuit could be implemented in many different ways, in hardware or software, in the same or different devices. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, the invention would be useful in a computer system where processors are connected to multiple memory modules containing redundant code.

We claim:

1. Apparatus comprising:
   a first module capable of being coupled to a plurality of connectors; the plurality of connectors coupled to a plurality of corresponding devices, each connector being capable of providing a connectivity indication;
   wherein the first module is operable to prevent itself from fully powering up if the first module fails to receive a connectivity indication from each connector in a first subset of the plurality of connectors when coupled to the plurality of connectors;
   wherein the devices are disk drives; and
   wherein each disk drive in a first subset of the plurality of disk drives is a first module boot disk, and wherein each first module boot disk is coupled to one of the connectors in the subset of the plurality of connectors.

2. The apparatus of claim 1 wherein the number of connectors in the plurality of connectors is four, and the number of disk drives in the first subset of the plurality of disk drives is two.

3. The apparatus of claim 1 wherein each connector of the plurality of connectors comprises a first section for coupling to the first module and a second section coupled to the devices, and wherein a connectivity indication indicates that the first section is properly mated to the second section.

4. The apparatus of claim 1 further comprising:
   a second module capable of being coupled to the plurality of connectors;
   wherein each disk drive in a second subset of the plurality of disk drives is a second module boot disk, and wherein each second module boot disk is coupled to one of the connectors in a second subset of the plurality of connectors;
   wherein the second module is operable to prevent itself from fully powering up if the second module fails to receive a connectivity indication from each connector in the second subset of the plurality of connectors when coupled to the plurality of connectors.

5. The apparatus of claim 1, further comprising:
   a second module capable of being coupled to the plurality of connectors; and
   an enclosure which encloses the first and second modules while excluding the plurality of disk drives.

6. Apparatus comprising:
   a first module capable of being coupled to a plurality of connectors; the plurality of connectors coupled to a corresponding plurality of disk drives, each connector being capable of providing an connectivity indication;
   wherein each disk drive in a first subset of the plurality of disk drives is a first module boot disk;
   wherein the first module is operable to prevent itself from fully powering up if the first module fails to receive a connectivity indication from each connector coupled to a first module boot disk when coupled to the plurality of connectors;
   a second module capable of being coupled to the plurality of connectors;
   wherein each disk drive in a second subset of the plurality of disk drives is a second module boot disk;
   wherein the second module is operable to prevent itself from fully powering up if the second module fails to receive a connectivity indication from each connector coupled to a second module boot disk when coupled to the plurality of connectors.

7. The apparatus of claim 6 wherein each connector of the plurality of connectors comprises a first section for coupling to the first or second module and a second section coupled to a disk drive, and wherein a connectivity indication indicates that the first section is properly mated to the second section.

8. The apparatus of claim 6, further comprising:
an enclosure which encloses the first and second modules while excluding the plurality of disk drives.

9. A method comprising the steps of:
coupling a first module to a plurality of connectors; the plurality of connectors coupled to a plurality of corresponding devices, each connector being capable of providing a connectivity indication; and
preventing the first module from fully powering up if the first module fails to receive a connectivity indication from each connector in a first subset of the plurality of connectors;
wherein each disk drive in a first subset of the plurality of disk drives is a first module boot disk, and wherein each first module boot disk is coupled to one of the connectors in the subset of the plurality of connectors.

10. The method of claim 9 wherein the number of connectors in the plurality of connectors is four, and the number of disk drives in the first subset of the plurality of disk drives is two.

11. The method of claim 9 wherein each connector of the plurality of connectors comprises a first section for coupling to the first module and a second section coupled to the devices, and wherein an connectivity indication indicates that the first section is properly mated to the second section.

12. The method of claim 9 further comprising the steps of:
coupling a second module to the plurality of connectors;
wherein each disk drive in a second subset of the plurality of disk drives is a second module boot disk, and wherein each second module boot disk is coupled to one of the connectors in a second subset of the plurality of connectors;
preventing the second module from fully powering up if the second module fails to receive a connectivity indication from each connector in the second subset of the plurality of connectors when coupled to the plurality of connectors.

13. The method of claim 9, further comprising the step of:
providing a second module capable of being coupled to the plurality of connectors; and
positioning the first and second modules in an enclosure which is configured to enclose the first and second modules while excluding the plurality of disk drives.

14. A method comprising the steps of:
coupling a first module to a plurality of connectors; the plurality of connectors coupled to a corresponding plurality of disk drives, each connector being capable of providing a connectivity indication;
wherein each disk drive in a first subset of the plurality of disk drives is a first module boot disk;
preventing the first module from fully powering up if the first module fails to receive a connectivity indication from each connector coupled to a first module boot disk when coupled to the plurality of connectors;
coupling a second module to the plurality of connectors;
wherein each disk drive in a second subset of the plurality of disk drives is a second module boot disk;
preventing the second module from fully powering up if the second module fails to receive a connectivity indication from each connector coupled to a second module boot disk when coupled to the plurality of connectors.

15. The method of claim 14 wherein each connector of the plurality of connectors comprises a first section for coupling to the first or second module and a second section coupled to a disk drive, and wherein a connectivity indication indicates that the first section is properly mated to the second section.

16. The method of claim 14, further comprising the step of:
positioning the first and second modules in an enclosure which is configured to enclose the first and second modules while excluding the plurality of disk drives.

* * * * *